United States Patent [19]
Spevack

[11] 3,940,473
[45] Feb. 24, 1976

[54] THERMAL CONTROL IN DUAL TEMPERATURE SYSTEMS

[75] Inventor: Jerome S. Spevack, New Rochelle, N.Y.

[73] Assignee: Deuterium Corporation, White Plains, N.Y.

[22] Filed: Dec. 30, 1971

[21] Appl. No.: 214,494

Related U.S. Application Data

[60] Continuation of Ser. No. 587,365, Sept. 26, 1966, abandoned, which is a continuation of Ser. No. 822,973, June 25, 1959, abandoned, which is a division of Ser. No. 188,925, Sept. 29, 1950, Pat. No. 2,895,803.

[52] U.S. Cl.............................. 423/580; 423/563
[51] Int. Cl.².............................. C01B 5/02
[58] Field of Search............ 423/580, 563, 659; 23/270.5

[56] References Cited
UNITED STATES PATENTS

| | | | |
|---|---|---|---|
| 2,690,382 | 9/1954 | Joris | 423/648 |
| 2,787,526 | 4/1957 | Spevack | 423/580 |
| 2,895,803 | 7/1959 | Spevack | 423/580 |
| 3,142,540 | 7/1964 | Spevack | 423/580 X |

*Primary Examiner*—Earl C. Thomas

[57] ABSTRACT

A fluid treatment system including (a) the heating of a flow of carrier gas and the simultaneous vaporization thereinto of a liquid to be carried thereby in a first zone, and (b) the subsequent cooling of such flow and condensation of liquid therefrom in a third zone after the same has been subjected to a treatment including further heating and saturation of the gas with vapor of the liquid in a second zone, the principal proportion of the heat required being supplied in the first zone by transfer from the third zone by way of at least one indirect contact heat exchange. In particular embodiments the indirect contact heat exchange is effected with at least one circulation of liquid passing in countercurrent direct contact heat exchange with the gas. In particular embodiments special advantages are obtained by controlling the temperature of the condensate formed in the third zone by co-current or counter-current flow thereof with respect to the gas being cooled therein.

28 Claims, 7 Drawing Figures

THERMAL CONTROL IN DUAL TEMPERATURE SYSTEMS

This is a continuation of application Ser. No. 587,365 filed Sept. 26, 1966, now abandoned, which was a continuation of application Ser. No. 822,973 filed June 25, 1959, now abandoned, which was a division of my copending parent application Ser. No. 188,925 filed Sept. 29, 1950 (now Pat. No. 2,895,803 issued July 21, 1959).

The described invention which is claimed herein relates to improvements in methods and apparatus for the control of temperature, saturation and solubility in systems in which both liquid and gas are present together, at different temperatures in different locations in the system. In such systems, for instance, as disclosed in U.S. Pat. No. 2,787,526, issued April 2, 1957, a single stage system or each stage of a cascade employs a cold tower and a hot tower and the progress of the exchange reactions through the system has required alternate and repeated cooling and heating of the substances involved in a very costly manner. These temperature reversals taken with the humidity variations and loss of costly materials with the waste have constituted the outstanding factors in the operating costs and have been determinative of the practicability of the system.

An object of this invention is to provide improved systems for reducing such cost factors in a manner economizing on the energy to be supplied and greatly reducing the cost of operation while at the same time maintaining the rate and quality of output.

Further objects of the invention will appear from the following specification taken in connection with the accompanying drawings in which.

The features of the present invention are typically illustrated in connection with the concentration of deuterium by countercurrent reactions at contrasting high and low temperatures. Where the reactants for this purpose are hydrogen sulfide gas ($H_2S$) and liquid water ($H_2O$), the reactions are ionic as explained in my aforesaid parent application and equilibrium conditions favor concentration of the deuterium in the water phase with a greater concentration effect occurring at the lower temperature. Proper operation of the process gives rise to a concentration gradient in the towers and causes an accumulation of deuterium as heavy water at the bottom of the cold tower. In the systems shown, hydrogen sulfide gas is continuously recycled from the top of the cold tower to the bottom of the hot tower, always flowing countercurrent to the water.

The supply of liquid, e.g. water, (FIG. 1a) enters at 10 and passes through water conditioner 11 and pump 12 to the top of the cold tower 14 of the first stage. As hereinafter explained, there is a countercurrent of chemically different gas ($H_2S$) passing upward in this tower 14, the temperature of this cold exchange reactor being maintained at about 20°C., for instance, for a pressure of 3 atmospheres.

Figure 1A:
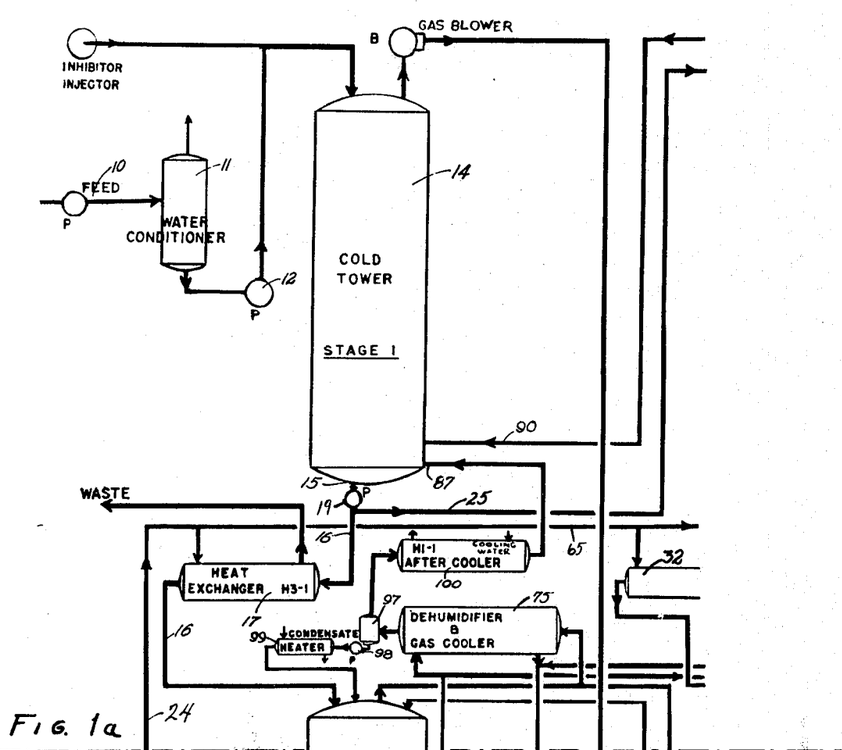
FIGS. 1a, 1b, 1c, and 1d show connected parts of a flow diagram illustrating preferred embodiments of the present invention associated in a cascade embodiment of a system of the class described.

The cold liquid discharged at 15 at the bottom of the tower by pump 19 is divided, one portion going by conduit 16 through heat exchanger 17 to be heated thereby and passed on to the top of the hot tower 18 of this first stage. Here again there is a countercurrent of gas for the hot (80°C.) exchange reaction and the hot liquid discharged at 20 at the bottom of the tower is passed by pump 21 and conduit 22 through stripper 67 and heat exchanger 23 removing dissolved gas ($H_2S$) from the liquor and raising the temperature of the liquor which then passes through conduit 24 to heat exchanger 17 where it serves to raise the temperature of the first stage liquid passing from the cold to the hot tower. The discharge of this circulation of heating liquid from exchanger 17 passes to waste.

The other portion of the cold liquid discharged from the cold tower to 15 passes by conduit 25 to subsequent operations, from which hot liquid may be received through pipe 39 to the top of the hot tower 18. Thus in the form shown in FIGS. 1a – 1d the liquid from conduit 25 passes to the top of the cold tower 28 of the second stage for the cold (20°C.) reaction with the upward sweeping countercurrent of gas and the cold liquid discharged at 29 passes through pump 30 and in part through pipe 31 and heat exchanger 32 raising the temperature of the liquid for entry at 33 into the hot tower 36 where it meets the countercurrent of gas, this hot reaction being at about 80°C. and discharging the hot liquid at 37 to pump 38 passing the liquid through pipe 39 to the top of the hot tower 18. The remainder of the cold discharge from tower 28 passes by piping 40 to the top of the cold tower 42 of the third stage where it is reacted by the countercurrent gas and discharged at 43 to be passed by pump 44 and by piping 45 to heat exchanger 46 raising its temperature for discharge through piping 47 to the top of the hot (80°C.) tower 48 and is subjected to reaction with the countercurrent gas and discharge at 49 through pump 50 passing the hot liquid through piping 51 to the top of the next preceding hot tower 36. The other part of the cold discharge from tower 42 passes by pipe 52 to the top of the fourth stage cold tower 56 at 20°C. where it reacts with the countercurrent gas and is discharged at 53 through pump 54 and piping 55 to heat exchanger 57 and piping 58 to the hot tower 60. The discharge of hot liquid from this tower at 61 is passed by pump 62 and piping 63 to the top of the hot tower 48 of the preceding stage, completing the circuit of the liquid within the system unless additional stages are found advantageous.

No temperature treatment is required for the liquid flows to the cold towers assuming an initial supply at the right temperature. The liquids supplied to the hot towers are raised in temperature by the heated waste discharge. In the form shown this waste discharge flows from the primary hot tower 18, and waste pipe 24 is connected to feed pipe 65 leading to the heat exchangers 32, 46 and 57 of the second, third and fourth stages respectively. The temperature regulation of the liquid is thus provided from sources within the system and additional steam is only drawn upon in connection with the final stripping of the discharge liquor at 67 and return of the separated gas to the hot tower 18.

This stripping is another feature of the improved process whereby dissolved gas ($H_2S$) is removed from the waste liquor. This is accomplished in a simple but effective way at essentially no extra energy expense. The amount of steam that is still required to make up for process inefficiencies and to complete the gas heating and humidification as hereinafter explained, is put to an additional use before it enters the hot tower 18. This steam entering at 66 is passed countercurrent to the processed waste liquor in the contact stripping tower 67. In this manner the dissolved hydrogen sulphide is removed from the waste liquor and swept back through outlet pipe 68 to the hot tower 18 together with the steam. Stripping efficiency which leaves less than one part per million residue may be attained. The hot liquid discharge at 69 from stripper 67 is circulated in heat exchanger 23 to increase the temperature of the waste liquor supply prior to its employment for heating fluid flowing from a cold tower to a hot tower. In the form shown the augmented temperature waste liquid from 23 is applied to heat a plurality of liquid streams flowing from cold towers to hot towers, by delivering it to the subsequent heaters 17, 32, 46 and 57 for the liquid entering the hot towers, the liquor being raised, for instance, from 80°C. in conduit 22 to 85°C. in conduit 24.

The conditioning of the countercurrent gas (for instance ($H_2S$) is attained with utmost economy. The gas supplied to the cold tower 14, and in the cascade form shown to the cold towers 28, 42 and 56, is efficiently cooled and dehumidified and the gas supply to the hot tower 18 is heated and humidified with interchange of energy between these operations. In the multi-stage form shown, the hot towers of the remaining stages receive their supplies from the hot towers of the previous stages, so that all treatment of the gas supplies to the second, third and fourth stage hot towers is dispensed with. This novel multi-stage arrangement, which is claimed in my copending application, results in a type of cascade system which integrates the plant so that each stage is not an independent unit but is a working part of the overall system. The hot humidified gases required at the bottom of the second stage hot tower 36 are obtained through piping 70 from the hot gases leaving the hot tower 18 of the first stage, and all of the hot liquor from the hot tower 36 of the second stage returns by piping 39 to the hot tower 18 of the first stage. Similarly hot tower 48 receives its gas supply from preceding hot tower 36 by piping 71 and returns to tower 36 its hot liquor discharge by piping 51, while hot tower 60 receives its hot gas through pipe 72 from the preceding hot tower 48 and returns to tower 48 its hot liquid discharge through pipe 63. In said multi-stage arrangement, the final discharge of hot gases from fourth stage hot tower 60 pass out through piping 74 to subsequent conditioning treatment and is then used to supply the countercurrent gas to cold tower 56 of the fourth stage.

An important aspect of the present system is the recovery and use of the low level energy which is available in the cooling and dehumidification of hot humidified gases. Instead of cooling these hot gases with cooling water and wasting the heated water, by the present invention the latter is circulated in a cyclic treatment reclaiming the heat and using it for heating and humidification of gases entering a hot tower.

In the system shown the hot gases from the tower 18 must be cooled and dehumidified before they can be used in the cold tower 14, and in the multi-stage arrangement shown the same problem is presented at each following stage. In accordance with this invention, a supply of these hot gases from tower 18 on their way to the cold tower 14 are passed through the dehumidifier and gas cooler 75 which is cooled by water supplied by pipe 76. This water raised in temperature is fed by pipe 77 to the top of a special humidifier tower 78 and through this tower 78 the cold gases brought by pipe 79 from cold tower 14 are passes in direct contact countercurrent to the hot water. By this efficient direct contact method the cold gases are simultaneously heated and humidified while the circulating liquor is cooled. The hot humidified gases are passed by pipe 80 into the hot tower 18 where they are further heated and have a quantity of vapor of said liquid added thereto while in gas and liquid contact with a quantity of liquid in said tower 18 and with the steam stripper effluent gases delivered thereto via 68. The cooled liquor via 76 is recirculated to the dehumidifier and cooler 75 to pick up another charge of energy for delivery to the humidifier 78. Thus, the recirculated liquid circulates in a closed cycle 75, 77, 78, 76. In the system shown, in which the recirculated liquid comprises water, a small amount of make-up water is continuously added to this liquor cycle in order to replace that portion which is consumed in humidification of the gas stream. This may conveniently be drawn from the discharge pipe 22 from hot tower 18 or from the feed, etc.

A further advantage of the embodiment shown in FIGS. 1$a$ – 1$d$ is that all of the energy from the dehumidifiers of all of the stages is available for humidification and gas heating in the humidifier 78 of the first stage. These stages, two, three and four, receive their gases direct from the preceding stage in each case and so humidifiers for these stages are dispensed with. In each of these stages the corresponding dehumidifier and cooler 84, 85, 86 intervening in the gas passage between the hot tower and the cold tower is cooled by circulation from pipe 82, drawing its supply from pipe 76, and pipe 83 returning the discharges to pipe 77 so that these dehumidifiers 84, 85, 86 of these subsequent stages are in circuit with the cyclic circulation through humidifier 78 and supply energy thereto.

In the cascade system shown, the cooled gases from hot tower 18 pass into the bottom of cold tower 14 at 87 and are joined there by the cold gases brought from the cold tower 28 by pipe 88, gas pump 89 and pipe 90. Similarly the cold tower 28 is supplied at 91 with cooled gases from hot tower 36 and at 92 with cold gases from tower 42, while tower 42 receives cooled gases at 93 from hot tower 48 and at 94 is supplied with cold gases from cold tower 56, which latter tower receives its supply of gases at 95 solely from hot tower 60.

In addition to the dehumidifying and cooling of the hot gases at 75, 84, 85, 86, they may be subjected to a separating action as in separator 97 of stage one receiving the discharge from cooler 75 and separating out the liquid. In the system shown, the separated liquid from 97 is passed by pump 98 to heater 99 and delivered into the top of the hot tower 18. The energy for heater 99 is supplied from an outside source. The gas discharge from separator 97 is fruther cooled in aftercooler 100 supplied with cooling circulation from any suitable source and the condensate from this aftercooler is carried into tower 14 with the gas stream. Similar condensers and coolers may be provided at the subsequent stages as shown.

In the final stage of the cascade system of FIGS. 1$a$-1$d$ the separator 101 separates out the liquid content of the gases from condenser 86 and pump 102 delivers the condensate to discharge pipe 103 and heater 104 from which the liquid raised in temperature is returned to the hot tower 60.

In this form the gas is an exchange medium and is recycled without being consumed. Make-up gas in small amounts may be supplied preferably at the entrance to the cold tower of the first stage.

The diagrammatic showing and descriptions herein are merely illustrative and descriptive of the invention, and changes in number of stages, temperature of operation, pressure of operation, the kinds of substances used, and other details may be resorted to within the principle of the invention.

Figure 1B:
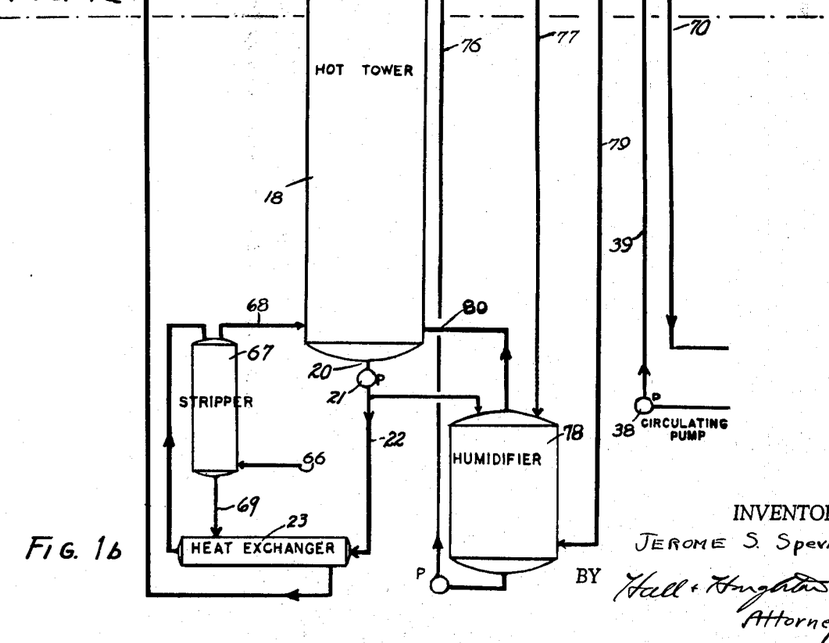
Figure 1C:
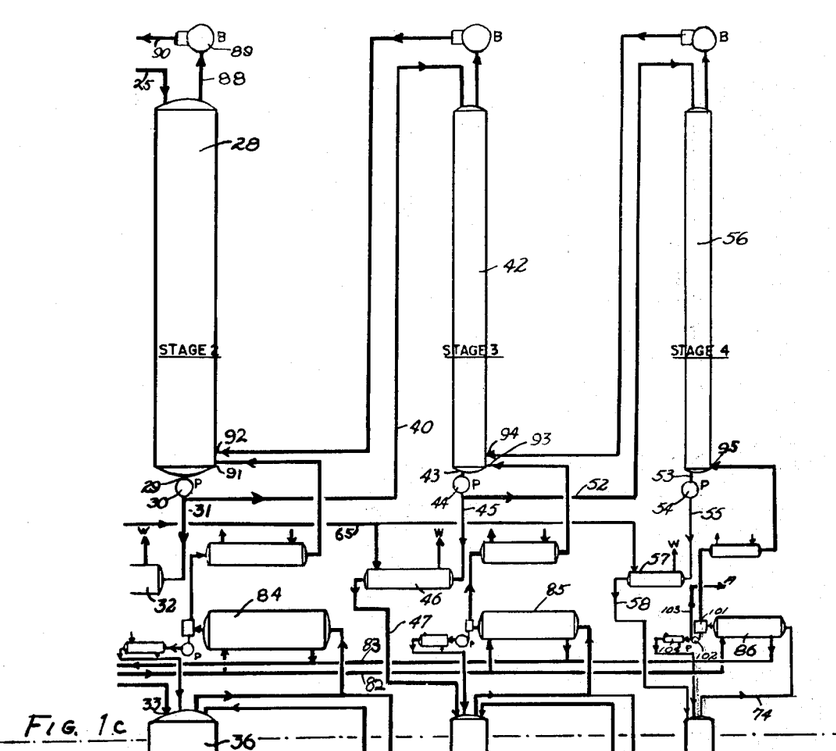
Figure 1D:
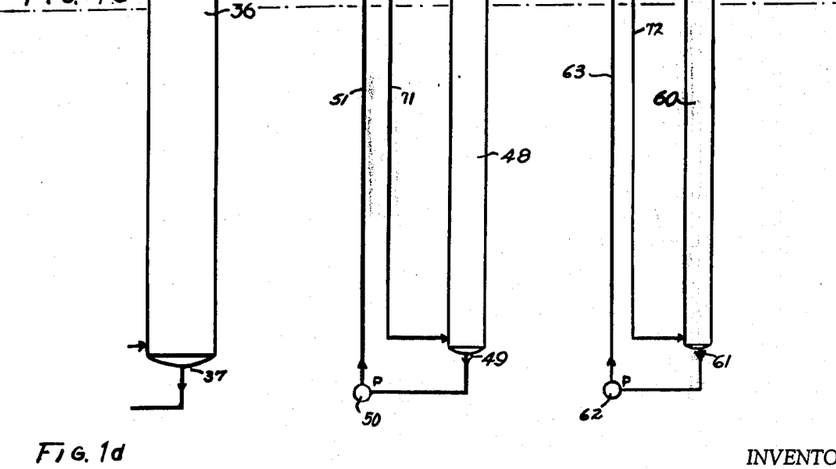
Figure 2A:
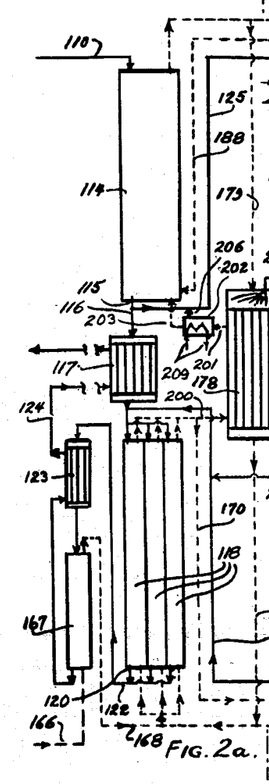
FIGS. 2a and 2b show a similar flow sheet illustrating a modified form of temperature and humidity adjusting system of this invention.
Figure 2B:
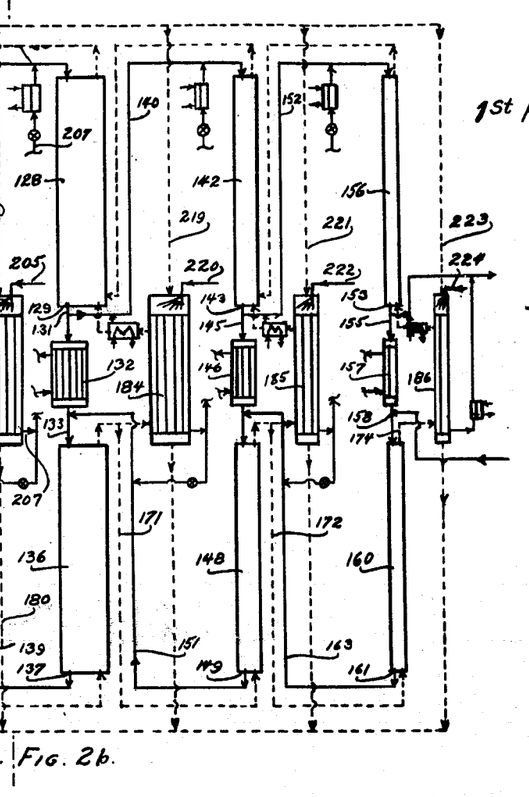

The modified cascade system to which the invention is applied in FIGS. 2a and 2b is shown with four stages in first of which has the hot reaction divided between three parallel hot towers 118. In general the handling of the flows and the connections of the reactors and stages are similar and the parts in FIGS. 2a and 2b are in most instances numbered one hundred above the numbers applied to the corresponding parts in FIGS. 1a to 1d. For simplicity the pumps have been omitted from FIGS. 2a and 2b and the liquid stream is in full lines and the gas stream in broken lines. The heat recovery arrangement associated with the towers of FIGS. 2a and 2b is modified and does not employ the closed circuit fluid circulation typified by 75, 76, 77, 78 of the system of FIGS. 1a to 1d. Instead a supply of the hot gases from towers 118 on their way to the cold tower 114 are passed by conduit 200 to heat exchanger 178 and are cooled and have their moisture in part condensed by the countercurrent of a flow of the cold gases from tower 114 by pipe 179. The partially cooled gas from exchanger 178 is passed by pipe 201 to the secondary cooler and condenser 202 and thence by pipe 203 to the cold tower 114. The cooling circulation indicated at 209 for cooler-condenser 202 is supplied from an outside source.

In this system of FIGS. 2a and 2b the heat exchanger 178 raises the temperature of the cool gases received from cold tower 114 and at the same time provides heat for vaporization of the moisture for humidification, the make-up water for humidification being fed in at 205 at the entrance to the heat exchanger. Condensate from exchangers 178 and 202 are collected and delivered through pipes 206, 207 respectively wholly or in part to the top of the cold tower of the next succeeding stage.

In a similar manner a supply of the hot gases from towers 136, 148 and 160 on their way to the cold towers 128, 142 and 156 respectively are passed to heat exchangers 184, 185 and 186 respectively and are cooled and have their moisture in part condensed by the countercurrent of a supply of cold gases from tower 114 by pipes 219, 221 and 223 respectively. The said supplies of gases from tower 114 are raised in temperature in heat exchangers 184, 185 and 186 and at the same time heat is provided for vaporization of moisture for humidification, this make-up water for humidification being fed in at 220, 222 and 224 respectively.

In any system of heat recovery between fluids entering and leaving a hot reactor, there may be direct physical contact only between the fluids entering and leaving, respectively, a single end of the reactor. This limitation is necessary to avoid commingling of processed material with unprocessed material. Accordingly, the system described herein has made use of the very efficient direct intimate contact methods of heat transfer together with the indirect non-contacting methods as required for the systems to which the invention is illustratively applied herein. For example, in FIGS. 1a to 1d the energy available from the gas leaving the hot tower is transferred by indirect contact heat exchanger (75, FIG. 1a; 84, 85, 86, FIG. 1c) to water which in turn transfers the energy by direct contact (intimate mixing in a countercurrent tower 78, FIG. 1b) with the gas entering the bottom of the hot tower. In this way it is possible to simultaneously heat and humidify the gas entering the hot tower. Likewise in FIGS. 2a and 2b, in exchanges 178, 184, 185 and 186 there is a simultaneous heating of the gas and vaporizing of the water required for humidification.

Another modified system may be employed in which the heat exchanges between the hot and cold flows are in general the reverse of those employed in FIGS. 1a and 1b. This modification makes use of a heat transfer cycle involving the pick-up of energy from a hot humidified gas by a liquid stream in a countercurrent direct contact, gas cooler dehumidifier tower and the subsequent liberation of this energy from the liquid to a cold gas stream by indirect contact in a countercurrent heat exchanger.

In this modification (FIG. 3) the cold tower 314 may be extended to include a section 314a at its bottom (or a separate tower) which will serve as the direct contact gas cooler-dehumidifier. The cold liquid from the bottom of the cold tower 314 together with an auxiliary flow via 314b passes countercurrent in 314a in contact with the hot humidified gas from the top of the hot tower 318 and becomes heated as the gas is cooled to the cold tower temperature. The cooled gas via 387 then flows upward through the cold tower 314. The hot liquid from the bottom of said direct contacting section 314a is divided. A portion 314a represented by the main cold tower stream plus the added condensate is sent to the hot tower and the balance 314d is sent to a heat exchanger 301 through which indirectly it transfers its energy to a mixture of the cold tower gas and a volume of liquid required for humidification, and thus the cold tower gas outflow 314f is simultaneously heated and humidified as the liquid in 314d is cooled. To make up for inefficiencies of the heat transfer equipment this liquid is further cooled in 314g, as required, before returning it to the same direct contacting section 314a via 314b.

The present invention thus affords systems for adjusting the temperature and saturation of a fluid and for reusing the heat therefrom in unique and advantageous manners.

From the illustrative embodiments of the invention above set forth it will be apparent to those skilled in the art that the present invention provides for the exchange of energy, in the course of the supply of heat to or extraction of heat from a saturable fluid and simultaneous desaturation or saturation thereof with saturating fluid, by a system in which at least one indirect contact heat transfer is employed, and in which, when supply and extraction of heat takes place at different locations, the system may advantageously include the employment of recirculating transfer liquid operating in direct contact with the saturable fluid at least at one of said locations and in series with said indirect heat transfer.

Thus, in summary, referring to FIG. 1, the process practiced therein is a thermal exchange method of the type which involves (a) the heating of a flow of carrier gas, e.g. $H_2S$, from 79, and the vaporizing thereinto of a chemically different liquid, e.g. $H_2O$, to be carried thereby, and (b) the subsequent cooling of such flow and condensation of such liquid therefrom after the same has been (c) subjected to treatment in tower 18, and in the form shown includes the improvement that (d) said heating and vaporizing step (a) is effected in a first zone 78, (e) said cooling and condensing step (b) is effected in a third zone 75, 97 from which said flow of liquid and condensate are separately removed, (f) said treatment step (c) is effected in a second zone 18 in which the flow is further heated and has a further quantity of vapor of said liquid added thereto via 68, (g) said flow is passed in sequence through said first, second and third zones, (h) a quantity of said liquid, piped from 21 to 78, is brought into physical contact with said flow of gas in said first zone 78, and (i) heat for effecting the heating of the cold gas from 79 and the vaporization of the liquid from 21 in the first zone 78 is obtained from the cooling and condensation in said third zone and such heat is transferred from the flow in said third zone 75 to the flow in said first zone 78 by way of a counter-current indirect contact heat exchange via the circulation of heat transfer fluid through 76, 75, 77, 78, 76 while maintaining the flows in 78 and in 75 out of contact with each other. In FIG. 1 the transfer is via the interposed circulation of heat transfer fluid 76, 77 which effects a direct contact transfer in the first zone 78, and comprises the liquid referred to in steps (a) and (h), and the carrier gas is recirculated via 87, 14 and 79, being treated and further cooled in 14, and its circulation through the zones is effected solely by blower B. Also, in FIG. 1, step (a) is effected by introduction of vapors of the liquid from 68 which are hotter than the flow through conduit 80, such vapors being in the form of steam when said liquid comprises water. When the carrier gas is soluble in the liquid, as in the case of $H_2S$ and $H_2O$, the liquid from 18 is passed to a fourth zone 23 where it is further heated and then to a fifth zone 67 where it is stripped with a hotter counter-current flow of said liquid in vapor phase, e.g. steam from 66, the uncondensed vapor and stripped gas via 68 being returned to 18, and the heated liquid from 67 effecting the heating in 23.

Figure 3:
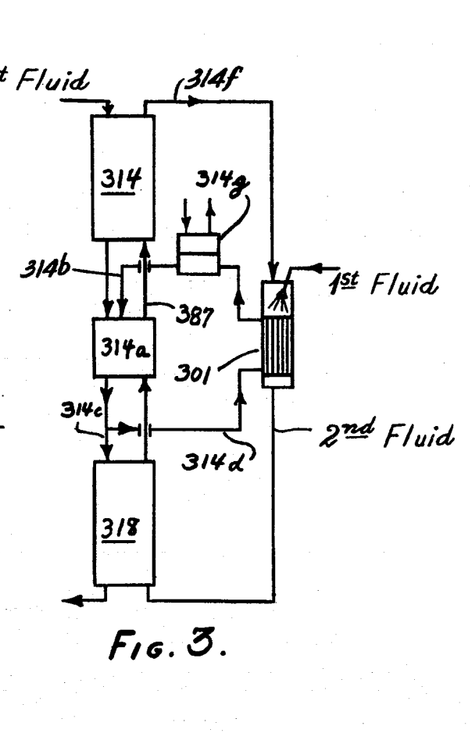
FIG. 3 shows a similar flow sheet of a further modification of the temperature and humidity adjusting system.

And in further summary, referring to FIG. 3, in which the gas heating side of 301 is the first zone, while 314 and 314a are the second and third zones, the direct contact heat transfer in 314a takes the place of the indirect contact heat transfer in 75 of FIG. 1, and the indirect contact heat transfer in 301 takes the place of the direct contact heat transfer in 78 of FIG. 1.

While there have been described herein what are at present considered preferred embodiments of the invention, modifications and changes and rearrangements may be made therein without departing from the essence of the invention; the exemplary embodiments are to be taken as illustrative and not restrictive of the invention, the scope of which is defined in the appended claims; and all modifications that come within the meaning and range of equivalency of the claims are intended to be included therein.

I claim:
1. In a method of the type which involves
   a. the heating of a flow of carrier gas and the vaporizing thereinto of a chemically different liquid to be carried thereby, and
   b. the subsequent cooling of such flow and condensation of such liquid therefrom after the same has been
   c. subjected to treatment, the improvement that:
   d. said heating and vaporizing step (a) is effected in a first zone,
   e. said cooling and condensing step (b) is effected in a third zone from which said flow and liquid condensate are separately removed,
   f. said treatment step (c) is effected in a second zone in which the said flow is further heated and has a further quantity of vapor of said liquid added thereto,
   g. said flow is passed in sequence through said first, second and third zones,
   h. a quantity of said liquid is brought into physical contact with said flow of gas in said first zone, and
   i. heat for effecting the heating and vaporizing in said first zone is obtained from the cooling and condensation in said third zone and such heat is transferred to the flow in said first zone from the flow in said third zone by way of a countercurrent indirect contact heat exchange while maintaining said flows out of contact with each other.

2. A method as claimed in claim 1, in which in step (i) the heat is transferred from the flow in the third zone to the flow in the first zone by a plurality of heat transfers to and from an interposed circulation of heat transfer fluid, at least one of said heat transfers being a direct contact heat transfer.

3. A method as claimed in claim 2, in which the heat is transferred from the interposed circulation of heat transfer fluid to the gas and liquid in said first zone by said direct contact heat transfer.

4. A method as claimed in claim 2, in which the heat is transferred to the interposed circulation of heat transfer fluid from the gas and liquid in said third zone by said direct contact heat transfer.

5. A method as claimed in claim 2, in which the heat transfer fluid in said interposed circulation comprises the liquid referred to in steps (a) and (h) and is circulated in direct contact with the flow of gas in said first zone.

6. A method as claimed in claim 2, in which the heat transfer fluid in said interposed circulation comprises the liquid condensate referred to in steps (b) and (c) and is circulated in direct contact with the flow of carrier gas and vapor in said third zone.

7. A method as claimed in claim 1, further comprising the step of recirculating the carrier gas which has been cooled in step (b) for re-use in step (a).

8. A method as claimed in claim 7, in which the gas which has been cooled in step (b) is treated and further cooled before being re-circulated for re-use in step (a).

9. A method as claimed in claim 1, in which the flow through said first heating and vaporizing zone and second treating zone is produced solely by imparting motion to the carrier gas flowing to said first heating and vaporizing zone.

10. A method as claimed in claim 1, in which step (f) is effected with the aid of steam.

11. A method as claimed in claim 1, in which in step (f) the further heating of said flow and an addition of further vapor of said liquid thereto are effected by introducing into said second zone vapors of said liquid at a temperature greater than the temperature of the flow passed to said second zone.

12. A method as claimed in claim 1, wherein said liquid comprises water.

13. A method as claimed in claim 1, which method is applicable when said carrier gas is soluble in said liquid and further comprises:
   j. in the treatment in step (c), contacting the flow of carrier gas with a heated flow of said liquid and then passing said flow of liquid to a fourth zone as the flow of gas is passed to said third zone, k. further heating said flow of liquid in said fourth zone by passing it in counter-current indirect contact heat exchange to a flow of heating fluid and then passing said further heated flow of liquid from said fourth zone to a fifth zone, l. in said fifth zone still further heating said flow of liquid and stripping dissolved gas therefrom by passing in counter-current direct contact therewith a hotter flow of said liquid in vapor phase, m. withdrawing from said fifth zone uncondensed vapor of said liquid together with stripped gas and mixing the same with at least one of the flows being contacted in said step (j) for effecting the heating of step (f), and n. withdrawing the still further heated and stripped flow of said liquid from said fifth zone and passing it as the flow of heating fluid in step (k).

14. A method as claimed in claim 13, in which in step (i) the heat is transferred from the flow in the third zone to the flow in the first zone by a plurality of heat transfers to and from an interposed circulation of heat transfer fluid, at least one of said heat transfers being a direct contact heat transfer.

15. A method as claimed in claim 14, in which the heat is transferred from the interposed circulation of heat transfer fluid to the gas and liquid in said first zone by said direct contact heat transfer.

16. A method as claimed in claim 14, in which the heat is transferred to the interposed circulation of heat transfer fluid from the gas and liquid in said third zone by said direct contact heat transfer.

17. A method as claimed in claim 13, in which the vapor pressure of the hotter flow of said liquid in vapor phase referred to in step (l) is greater than the pressure at which the contact in step (j) is effected.

18. A method as claimed in claim 1, in which in step (h) the quantity of liquid brought into contact with said flow of carrier gas in said first zone comprises a greater amount of liquid than is vaporized into said carrier gas in said first zone.

19. A method as claimed in claim 1, in which said further heating in step (f) is effected in the presence of a quantity of said liquid.

20. In a method of the type which involves
a. the heating of a flow of carrier fluid which is mixed with chemically different contained fluid and
b. the subsequent separation of contained fluid from solution in the flow of carrier fluid, the improvement that:
c. said heating step (a) is effected in a first zone from which the heated flow of carrier fluid and contained fluid is passed to a second zone,
d. said heated flow is further heated in said second zone and is then passed from said second zone and cooled by transferring heat therefrom to the flow in said first zone while maintaining said flows out of physical contact with each other, and
e. the further heating of said heated flow in said second zone is effected under gas and liquid direct contact thereof with a supply of one of said fluids at a higher temperature than that of the heated flow passed to said second zone.

21. A method as claimed in claim 20, in which said carrier fluid is a gas, said contained fluid is vaporizable liquid, said direct contact in step (c) is with a supply of said liquid, and said separation is effected by condensation of contained fluid from the flow of carrier gas as heat is transferred therefrom in step (b).

22. A method as claimed in claim 20, in which said carrier fluid in a liquid, said contained fluid is a gas which is soluble in said liquid, said direct contact in step (c) is with a supply of said liquid in vapor form, and said separation is effected by removal of released gas from said second zone.

23. A method as claimed in claim 20, in which said carrier fluid is water, said contained fluid is a gas soluble therein, and said direct contact in step (c) is effected by passing steam into said second zone in direct contact with and countercurrent to the flow of the carrier fluid therein.

24. A method as claimed in claim 23, in which the separation in step (b) is effected by delivering from said second zone uncondensed portions of said steam and gas released from the carrier fluid therein separately from the flow of water passed from said second zone.

25. An improved thermal exchange method of the type that comprises, in combination, the steps of
a. forming a first flow of gas phase substance,
b. heating said first flow and vaporizing thereinto to be carried thereby vapors of a vaporizable liquid substance different from said gas phase substance to form an augmented flow;
c. subjecting said augmented flow to treatment to form a treated flow, and
d. thereafter cooling said treated flow to condense therefrom vapors of said vaporizable liquid substance carried therein;

wherein the improvement comprises:
e. in forming said augmented flow in step (b), bringing said gaseous flow and a liquid flow of said second substance into physical contact in a first zone and supplying heat thereto in said first zone,
f. in forming said treated flow in step (c), further heating said augmented flow and adding thereto a further quantity of vapor of said vaporizable liquid in a second zone,
g. in step (d), extracting heat from said treated flow in a third zone, and separately removing from said third zone the flow of said gas phase substances and the liquid condensate condensed therefrom, and
h. transferring the heat extracted in the cooling and condensation in step (g) from the third zone to the first zone, to constitute the heat supplied for the heating and vaporizing of step (e) therein, by way of a counter-current indirect contact heat exchange, while
i. maintaining the flows in said first and third zones out of contact with each other.

26. A method as claimed in claim 25, in which in steps (b) and (e) the said liquid flow brought into physical contact in said first zone comprises a greater amount of liquid than is vaporized into said gaseous flow in said first zone.

27. A method as claimed in claim 25, in which said further heating in step (f) is effected in the presence of a quantity of said liquid.

28. A method as claimed in claim 25, in which one of said fluids is water.

* * * * *

UNITED STATES PATENT AND TRADEMARK OFFICE
CERTIFICATE OF CORRECTION

PATENT NO. : 3,940,473

DATED : February 24, 1976

INVENTOR(S) : Jerome S. Spevack

It is certified that error appears in the above–identified patent and that said Letters Patent are hereby corrected as shown below:

In the Data and Abstract Sheet:
In item [73], for "N.Y." read "N.Y. (assignee of undivided interest)".
In the text:
Col. 2, line 2, for "3" (bold face) read "5";
Col. 2, line 19, for "to 15" read "at 15";
Col. 3, line 25, for "($H_2S$" read "$H_2S$";
Col. 4, line 5, for "passes" read "passed";
Col. 4, line 11, for "quantity" read "further quantity";
Col. 5, line 14, for "in" read "the"; and
Col. 6, line 33, for "portion 314a" read "portion 314c".

Claims 1, 13, 20 and 25, for the letters identifying the listed steps "a." "b." etc., read "(a)", "(b)", etc.

Claims 6, 21 and 23, line 3 of each, for "(c)" read "(e)";
Claim 22, line 4, for "(c)" read "(e)";
Claim 25, step g, line 3, for "substance" read "substances";
Claim 28, line 1, for "25" read "20".

Signed and Sealed this

Seventh Day of June 1977

[SEAL]

Attest:

RUTH C. MASON
Attesting Officer

C. MARSHALL DANN
Commissioner of Patents and Trademarks

Disclaimer 3,940,473.—*Jerome S. Spevack*, New Rochelle, N.Y. THERMAL CONTROL IN DUAL TEMPERATURE SYSTEMS. Patent dated Feb. 24, 1976. Disclaimer filed May 29, 1980, by the assignee, *Deuterium Corporation.*

Hereby enters this disclaimer to claims 20, 22, 23 and 24 of said patent.

[*Official Gazette July 29, 1980.*]